United States Patent
Aase

(10) Patent No.: US 10,884,124 B2
(45) Date of Patent: Jan. 5, 2021

(54) METHOD AND ULTRASOUND IMAGING SYSTEM FOR ADJUSTING A VALUE OF AN ULTRASOUND PARAMETER

(71) Applicant: General Electric Company, Schenectady, NY (US)

(72) Inventor: Svein Arne Aase, Trondheim (NO)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 16/230,211

(22) Filed: Dec. 21, 2018

(65) Prior Publication Data

US 2020/0200899 A1 Jun. 25, 2020

(51) Int. Cl.
| | | |
|---|---|---|
| *G06F 3/0488* | (2013.01) | |
| *G01S 15/89* | (2006.01) | |
| *G01S 7/52* | (2006.01) | |
| *G06F 3/0484* | (2013.01) | |

(52) U.S. Cl.
CPC ...... *G01S 15/8906* (2013.01); *G01S 7/52053* (2013.01); *G01S 7/52084* (2013.01); *G06F 3/04847* (2013.01); *G06F 3/04883* (2013.01)

(58) Field of Classification Search
CPC .. G06F 3/0487; G06F 3/0488; G01S 15/8906; G01S 7/52053; G01S 7/52084
See application file for complete search history.

(56) References Cited

U.S. PATENT DOCUMENTS

| | | | |
|---|---|---|---|
| 2008/0221446 A1* | 9/2008 | Washburn | A61B 8/00 600/437 |
| 2009/0149749 A1* | 6/2009 | Heron | A61B 8/08 600/437 |
| 2013/0072795 A1* | 3/2013 | Mo | A61B 8/14 600/443 |

FOREIGN PATENT DOCUMENTS

WO WO-2018094118 A1 * 5/2018 ........... A61B 8/4427

* cited by examiner

*Primary Examiner* — Stacy Khoo

(57) ABSTRACT

An ultrasound imaging system and method includes acquiring an image with an ultrasound probe, displaying the image on a touch screen, and detecting a first touch gesture inputted via the touch screen. The ultrasound imaging system and method includes selecting a region of the image based on the first touch gesture, detecting a second touch gesture inputted via the touch screen, and adjusting a value of an ultrasound parameter for the region of the image based on the second touch gesture.

22 Claims, 6 Drawing Sheets

METHOD AND ULTRASOUND IMAGING SYSTEM FOR ADJUSTING A VALUE OF AN ULTRASOUND PARAMETER

FIELD OF THE INVENTION

This disclosure relates generally to a method and ultrasound imaging system for adjusting a value of an ultrasound parameter of an image with a touch screen.

BACKGROUND OF THE INVENTION

When acquiring and displaying images acquired with an ultrasound imaging system, it is typically desirable to have images with ultrasound parameters that are consistent in appearance throughout the whole image. Images generated from ultrasound data often need to have one or more local region adjusted for an ultrasound parameter such as gain, brightness, or contrast. As more ultrasound imaging systems include a touch screen to both display the image and receive touch gestures, there is a need for an easy and intuitive technique that allows a user to select a region and adjust one or more ultrasound parameters for that region via the touch screen.

For these and other reasons, an improved method and ultrasound imaging system for adjusting a value of an ultrasound parameter of an image is desired.

BRIEF DESCRIPTION OF THE INVENTION

The above-mentioned shortcomings, disadvantages, and problems are addressed herein which will be understood by reading and understanding the following specification.

In an embodiment, a method of ultrasound imaging includes acquiring an image with an ultrasound probe, displaying the image on a touch screen, and detecting a first touch gesture inputted via the touch screen. The method includes selecting a region of the image based on the first touch gesture, detecting a second touch gesture inputted via the touch screen, and adjusting a value of an ultrasound parameter for the region of the image based on the second touch gesture.

In an embodiment, an ultrasound imaging system includes an ultrasound probe, a touch screen, and a processor in electronic communication with the ultrasound probe and the touch screen. The processor is configured to control the ultrasound probe to acquire an image, display the image on the touch screen, and detect a first touch gesture inputted via the touch screen. The processor is configured to select a region of the image based on the first touch gesture, receive a second touch gesture inputted via the touch screen, and adjust a value of an ultrasound parameter for the region of the image based on the second touch gesture.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical, and other changes may be made without departing from the scope of the embodiments. The following detailed description is, therefore, not to be taken as limiting the scope of the invention.

Figure 1:
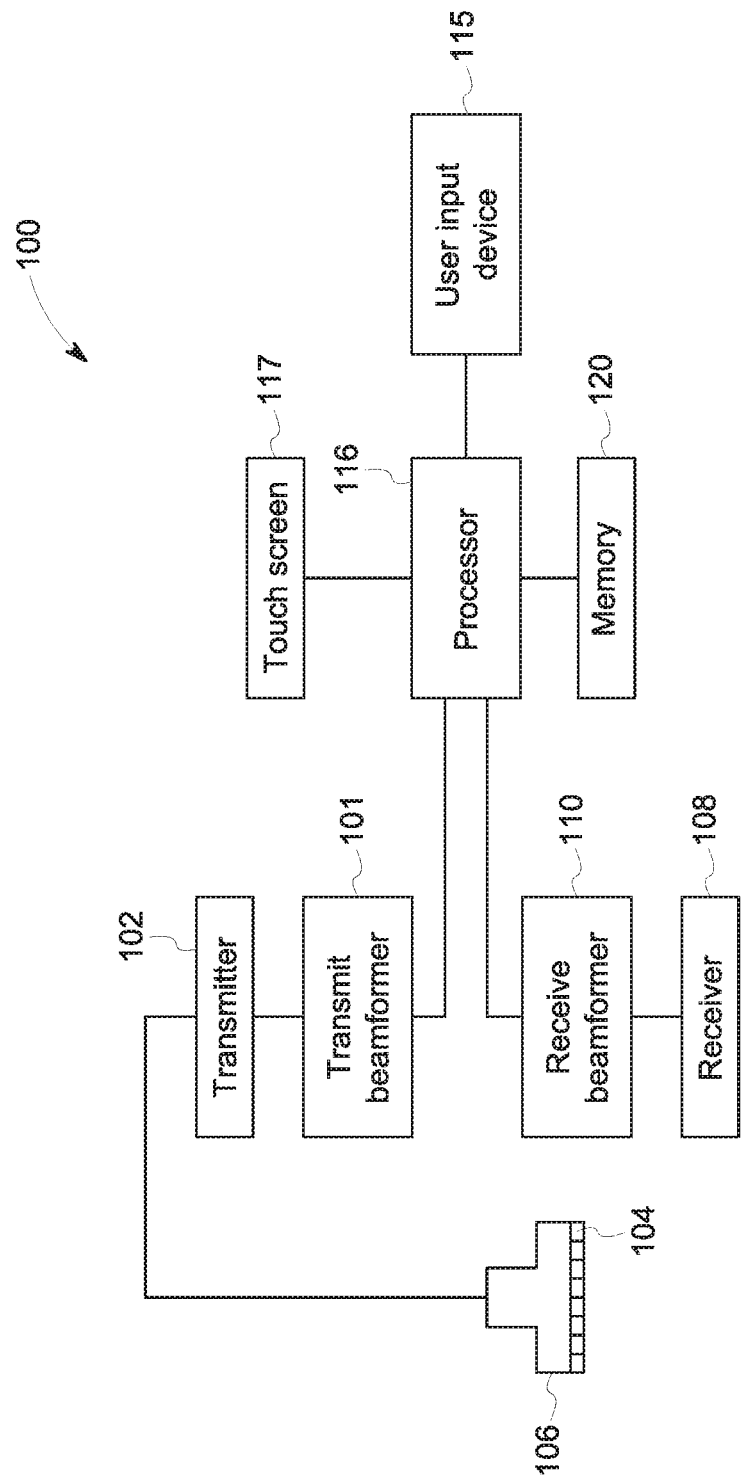
FIG. 1 is a schematic diagram of an ultrasound imaging system in accordance with an embodiment.

FIG. 1 is a schematic diagram of an ultrasound imaging system 100 in accordance with an embodiment. The ultrasound imaging system 100 includes a transmit beamformer 101 and a transmitter 102 that drive elements 104 within an ultrasound probe 106 to emit pulsed ultrasonic signals into a body (not shown). The ultrasound probe 106 may be a linear probe, a curved linear probe, a 2D array, a mechanical 3D/4D probe, an E4D probe capable of full beamforming in both elevation and azimuth directions, or any other type of ultrasound probe capable of acquiring ultrasound data. Still referring to FIG. 1, the pulsed ultrasonic signals are back-scattered from structures in the body, like blood cells or muscular tissue, to produce echoes that return to the elements 104. The echoes are converted into electrical signals by the elements 104, and the electrical signals are received by a receiver 108. The electrical signals representing the received echoes are passed through a receive beamformer 110 that outputs ultrasound data. According to some embodiments, the ultrasound probe 106 may contain electronic circuitry to do all or part of the transmit and/or the receive beamforming. For example, all or part of the transmit beamformer 101, the transmitter 102, the receiver 108, and the receive beamformer 110 may be situated within the ultrasound probe 106. The terms "scan" or "scanning" may also be used in this disclosure to refer to acquiring data through the process of transmitting and receiving ultrasonic signals. The terms "data" or "ultrasound data" may be used in this disclosure to refer to either one or more datasets acquired with an ultrasound imaging system. A user input device 115 may be used to control operation of the ultrasound imaging system 100, including to control the input of patient data, to change a scanning or ultrasound parameter, and the like.

The ultrasound imaging system 100 also includes a processor 116 to control the transmit beamformer 101, the transmitter 102, the receiver 108, and the receive beamformer 110. The processor 116 is in electronic communication with the ultrasound probe 106. The processor 116 may control the ultrasound probe 106 to acquire data. The processor 116 controls which of the elements 104 are active and the shape of a beam emitted from the ultrasound probe 106. The ultrasound imaging system 100 also includes a touch screen 117. The touch screen 117 provides and input/output interface between the ultrasound imaging system 100 and a user. The processor 116 sends signals to the touch screen 117, causing the touch screen 117 to display visual outputs to the user, such as images, a graphical user interface (GUI), video clips, menus, or any other type of visual output. The touch screen 117 outputs signals to the processor 116 based on the touch inputs, which may be in the form of one or more touch gestures, received via the touch screen 117.

The touch screen 117 includes a touch-sensitive surface or layer configured to receive touch inputs from the user. The touch screen 117 in combination with the processor 116 converts one or more detected touch gestures into actions, commands, or interactions. In some embodiments, the touch gestures may interact with a GUI displayed on the touch screen 117. The user may interact with the touch screen 117 using one or more fingers and/or an object, such as a stylus.

The touch screen 117 may use any type of technology to display visual outputs including a light-emitting diode (LED) display, an organic light-emitting diode (OLED) display, a liquid crystal display (LCD), a variable graphics array (VGA), or any other type of apparatus configured for displaying an image. Other display technologies may be used in other embodiments.

For purposes of this disclosure, the term "electronic communication" may be defined to include both wired and wireless connections. The processor 116 may include a central processor (CPU) according to an embodiment. According to other embodiments, the processor 116 may include other electronic components capable of carrying out processing functions, such as a digital signal processor, a field-programmable gate array (FPGA), or a graphic board. According to other embodiments, the processor 116 may include multiple electronic components capable of carrying out processing functions. For example, the processor 116 may include two or more electronic components selected from a list of electronic components including: a central processor, a digital signal processor, an FPGA, and a graphic board. According to another embodiment, the processor 116 may also include a complex demodulator (not shown) that demodulates the RF data and generates raw data. In another embodiment the demodulation can be carried out earlier in the processing chain. The processor 116 may be adapted to perform one or more processing operations according to a plurality of selectable ultrasound modalities on the data. The data may be processed in real-time during a scanning session as the echo signals are received. For the purposes of this disclosure, the term "real-time" is defined to include a procedure that is performed without any intentional delay. For purposes of this disclosure, the term "real-time" will be additionally defined to include an action occurring within 2 seconds. For example, if data is acquired, then a real-time display of that data would occur within 2 seconds. Those skilled in the art will appreciate that most real-time procedures or processes will be performed in substantially less time than 2 seconds. The data may be stored temporarily in a buffer (not shown) during a scanning session and processed in less than real-time in a live or off-line operation. Some embodiments of the invention may include multiple processors (not shown) to handle the processing tasks. For example, a first processor may be utilized to demodulate and decimate the RF signal while a second processor may be used to further process the data prior to displaying an image. It should be appreciated that other embodiments may use a different arrangement of processors.

The ultrasound imaging system 100 may continuously acquire data at a given frame-rate or volume-rate. Images generated from the data may be refreshed at a similar frame-rate or volume-rate. A memory 120 is included for storing processed frames of acquired data. In an exemplary embodiment, the memory 120 is of sufficient capacity to store at least several seconds worth of frames of ultrasound data. The frames of data are stored in a manner to facilitate retrieval thereof according to its order or time of acquisition. The memory 120 may comprise any known data storage medium.

Optionally, embodiments of the present invention may be implemented utilizing contrast agents. Contrast imaging generates enhanced images of anatomical structures and blood flow in a body when using ultrasound contrast agents including microbubbles. After acquiring data while using a contrast agent, the image analysis includes separating harmonic and linear components, enhancing the harmonic component, and generating an ultrasound image by utilizing the enhanced harmonic component. Separation of harmonic components from the received signals is performed using suitable filters. The use of contrast agents for ultrasound imaging is well-known by those skilled in the art and will therefore not be described in further detail.

In various embodiments of the present invention, data may be processed by other or different mode-related modules by the processor 116 (e.g., B-mode, color Doppler, M-mode, color M-mode, spectral Doppler, Elastography, TVI, strain, strain rate, and the like) to form 2D or 3D data. For example, one or more modules may generate B-mode, color Doppler, M-mode, color M-mode, spectral Doppler, Elastography, TVI, strain, strain rate and combinations thereof, and the like. The image beams and/or frames are stored, and timing information indicating a time at which the data was acquired in memory may be recorded. The modules may include, for example, a scan conversion module to perform scan conversion operations to convert the image frames from beam space coordinates to display space coordinates. A video processor module may be provided that reads the image frames from a memory, such as the memory 120, and displays the image frames in real time while a procedure is being carried out on a patient. A video processor module may store the image frames in an image memory, from which the images are read and displayed.

Figure 2:
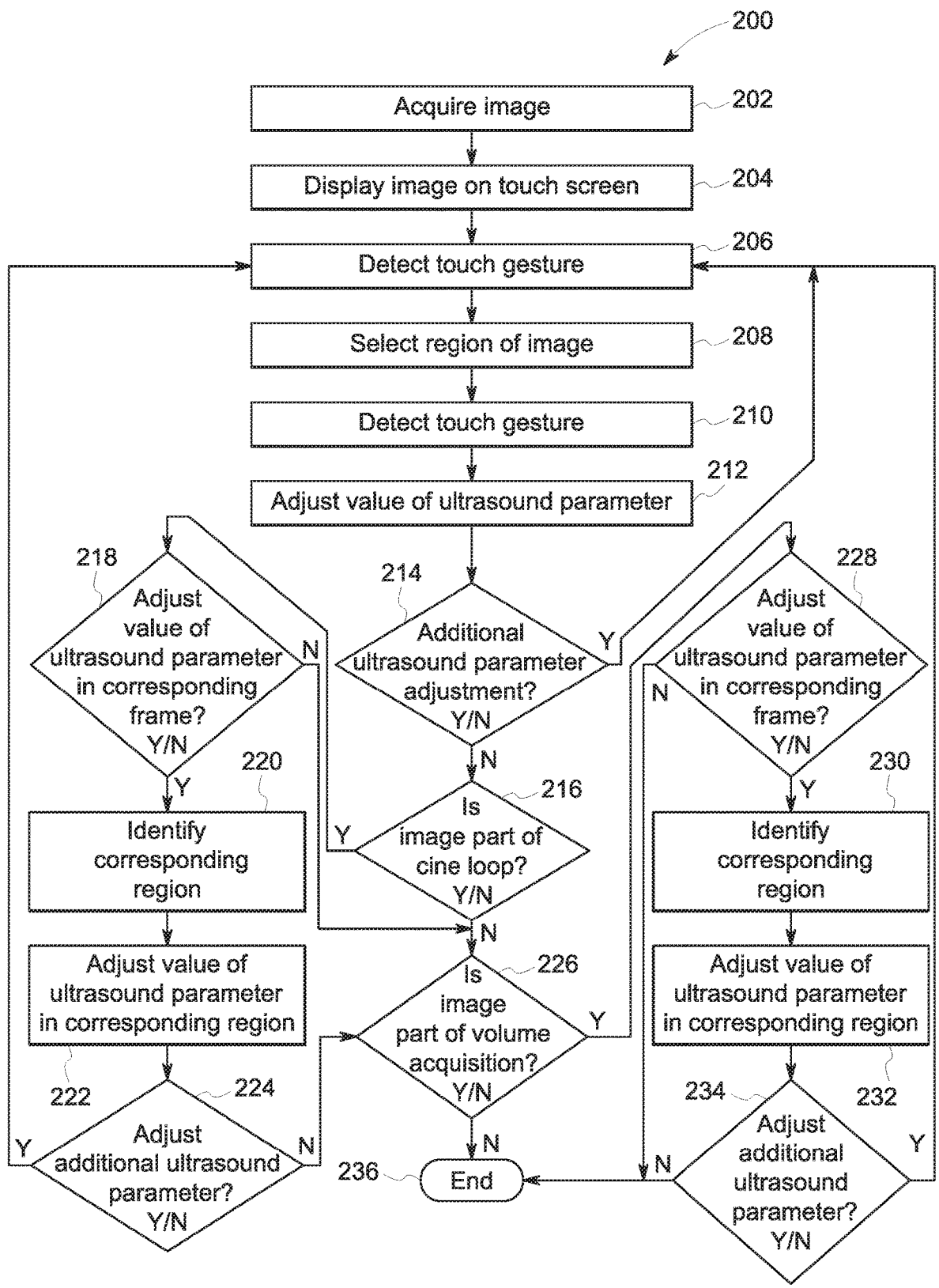
FIG. 2 is a flow chart of a method in accordance with an embodiment.

FIG. 2 is a flow chart of a method 200 in accordance with an exemplary embodiment. The individual blocks of the flow chart represent steps that may be performed in accordance with the method 200. Additional embodiments may perform the steps shown in a different sequence and/or additional embodiments may include additional steps not shown in FIG. 2. The technical effect of the method 200 is the adjusting of a value of an ultrasound parameter for a region of an image based on first and second touch gestures received through the touch screen 117.

At step 202, the processor 116 controls the ultrasound probe 106 to acquire an image. The processor 116 may control the elements 104 of the ultrasound probe 106 to acquire ultrasound data of a desired region of a patient. For example, according to an embodiment, the processor 116 may control the transmit beamformer 101 to shape and focus one or more transmit beams and the receive beamformer 110 to focus one or more receive beams. The ultrasound data may comprise 2D ultrasound data or 3D ultrasound data of a volume. The ultrasound data may also comprise data for generating a cine loop including a plurality of images showing a plane or a volume over a period of time.

Figure 3:
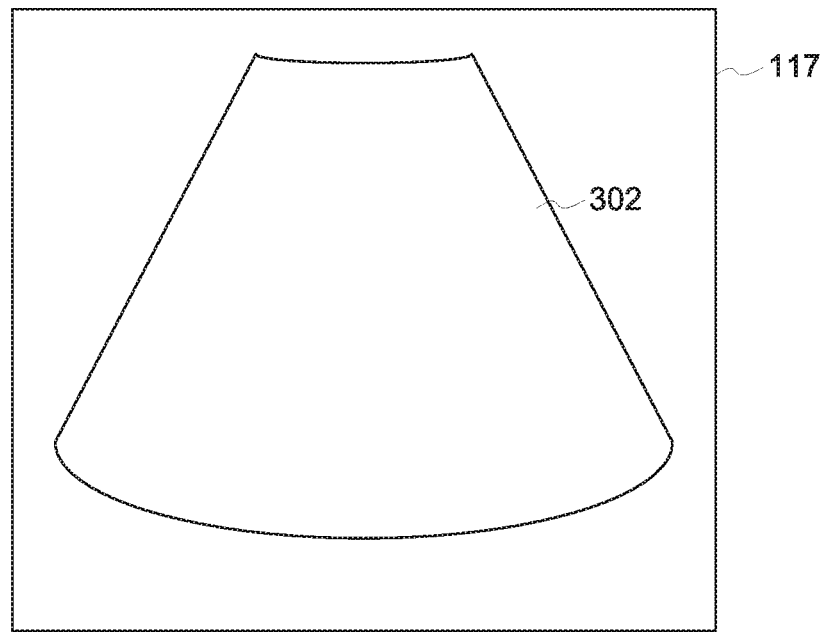
FIG. 3 is a schematic representation of an image in accordance with an embodiment.

At step 204, the processor 116 displays an image on the touch screen 117. The image is generated from the ultrasound data acquired at step 202. FIG. 3 is a schematic representation of an image 302 in accordance with an embodiment. The image 302 may be a 2D image based on 2D ultrasound data acquired along a plane or the image may represent a slice or plane based on data acquired as part of a volume acquisition. The image may be part of a cine loop including a plurality of images acquired over a period of time. The image may also be a rendering generated from volume (3D) ultrasound data. The rendering may include any type of rendering including, but not limited to: projection rendering techniques such as a maximum intensity projection (MIP) rendering, a minimum intensity projection (MINIP) rendering; surface rendering techniques, and thin slab rendering or thick slab rendering techniques. It should be appreciated that any other type of rendering techniques may be used to generate an image from volume ultrasound data.

At step 206, the processor 116 detects a first touch gesture inputted via the touch screen 117. The first touch gesture is performed by a user interacting with the touch screen 117. The first touch gesture may comprise one or more single-touch gestures, or the first touch gesture may comprise one or more multi-touch gestures. Single-touch gestures are gestures inputted via the touch screen 117 where the user only contacts the touch screen 117 at a single point of contact. Multi-touch gestures are gestures inputted via the touch screen 117 where the user makes two or more points of contact with the touch screen 117 at a time. For purposes of this disclosure, the term "touch gesture" will also be defined to include a touch of the touch screen 117 where the point of contact between the user and the touch screen 117 is stationary with respect to the touch screen 117.

Figure 4:
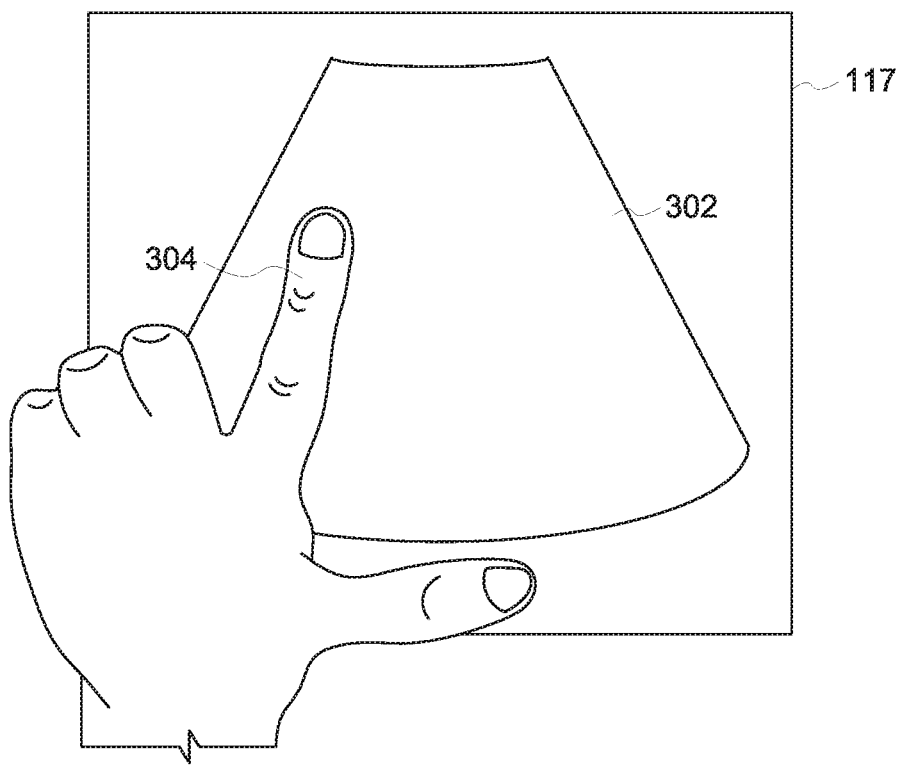
FIG. 4 is a schematic representation of a hand with respect to an image in accordance with an embodiment.

FIG. 4 is a schematic representation of a hand with respect to an image according to an embodiment. FIG. 4 includes the image 302 and a representation of a first hand 304 making a first touch gesture. According to the embodiment shown in FIG. 4, the first touch gesture includes covering the region 306 (shown in FIG. 6) of the image on the touch screen 117. FIG. 4 shows a finger from the first hand 304 contacting the touch screen 117 to select the region 306. While the embodiment shown in FIG. 4 shows a single finger contacting the touch screen 117 to identify the region 306, it should be appreciated that the user could use multiple appendages (such as fingers) and/or other parts of a user's hand to cover the region 306 on the touch screen 117.

According to other embodiments, a different type of first gesture may be used to identify the region 306. For example, according to another embodiment, the first touch gesture may include tracing a border of the region 306 on the touch screen 117 or performing other gestures to indicate the region 306. For example, the user may trace a border around the region 306 with a finger or a stylus. Or, according to other embodiments, the user may touch the entire area within the region 306 within a predetermined amount of time, such as within 1 second, within 2 seconds, or within 5 seconds. The user may, for instance, move the position of a point of contact between one or more fingers and the touch screen 117 to touch all of the region 306 within the predetermined amount of time. The value of the predetermined amount of time may be different according to other embodiments or the value of the predetermined amount of time may be user adjustable according to other embodiments.

At step 208, the processor 116 identifies the region 306 on the image based on the first touch gesture. As discussed hereinabove, the touch screen 117 may transmit signals to the processor 116 which the processor 116 interprets as a command to select the region 306.

According to an embodiment, the processor 116 may graphically highlight the region 306 on the image shown on the touch screen 117 to help the user see the region 306. This allows the user to confirm that the desired region has been selected. This may be particularly helpful for embodiments where the user is not inputting the second touch gesture while the first touch gesture is being inputted. For example, the processor 116 may use one or more of an outline, a color, a brightness, a translucency, and a pattern to graphically highlight the region 306. Graphically highlighting the region 306 allows the user to easily confirm that the region 306 is the desired size and shape with respect to the image 302 before adjusting the value of any ultrasound parameters.

According to an embodiment, the processor 116 may graphically highlight the region 306 on the image 302 after the user has inputted the first gesture. For example, according to the embodiment where the user covers the portion of the touch screen 117 corresponding to the region 306, the processor 116 may graphically highlight the region 306 for an amount of time after the user removes the first gesture from the touch screen 117. This may, for instance allow the user to confirm that the selected region 306 is of the desired size and shape.

Figure 5:
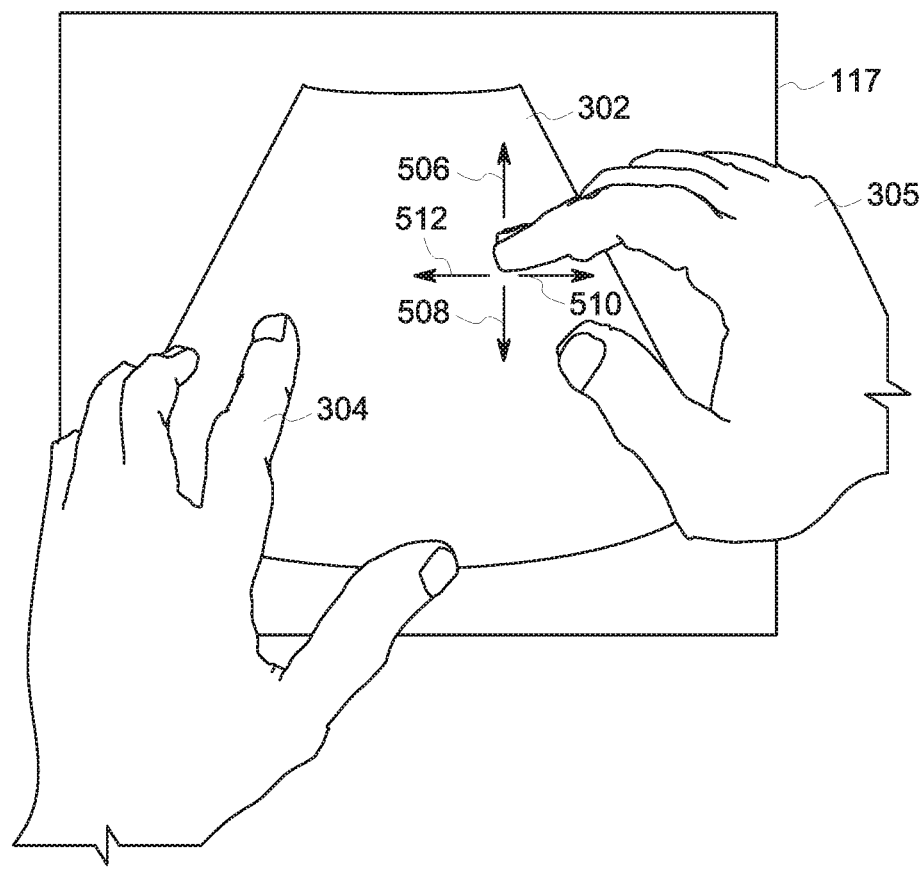
FIG. 5 is a schematic representation of two hands with respect to an image in accordance with an embodiment.

At step 210, the processor 116, detects a second touch gesture inputted via the touch screen 117. FIG. 5 shows a schematic representation of a first hand 304 inputting a first touch gesture and a second hand 305 inputting a second touch gesture according to an embodiment. The second touch gesture may be inputted while the first touch gesture is being inputted, or the second touch gesture may be inputted after the first touch gesture has been inputted.

FIG. 5 shows a schematic representation of an embodiment where the second touch gesture is a translational gesture. The embodiment in FIG. 5 shows an exemplary embodiment where the translational gesture is in a first direction 506. The user may perform the translational gesture by touching the touch screen 117 in a location and then translating the finger, and therefore, the point of contact, with the touch screen 117, in the first direction.

According to an embodiment, the user may increase the value of AN ultrasound parameter, such as gain, by performing the translational gesture in a first direction and decrease the value of the ultrasound parameter by performing the translation gesture in a second direction 508 that is opposite of the first direction 506. In other words, performing the translation direction in the first direction 506 would increase the gain while performing the translation direction in the second direction 508 would decrease the gain. According to other embodiments, the translational gesture may be performed in other directions, including, but not limited to, directions orthogonal to the first direction 506. According to other embodiments, translational gestures in a first direction 506 may be used to adjust a value of a first ultrasound parameter and translational gestures in a third direction 510 may be used to adjust a value of a second ultrasound parameter, where the second ultrasound parameter is different than the first ultrasound parameter. The first translational gesture may adjust a value of a first ultrasound parameter such as gain, while the second translational gesture may adjust a value of a second ultrasound parameter such as brightness for the region 306. Different embodiments may adjust different ultrasound parameters.

According to other embodiments, a second touch gesture of a different type may be used to adjust the value of the ultrasound parameter. For instance, the first touch gesture may be an expand gesture, such as increasing the distance between two or more fingers while the two or more fingers are contacting the touch screen 117, and the second touch gesture may be a pinch gesture, such as decreasing the distance between two or more fingers while the two or more fingers are contacting the touch screen 117. According to an embodiment, the expand gesture may be used to increase the value of the ultrasound parameter within the region 306 and the pinch gesture may be used to decrease the value of the ultrasound parameter within the region 306. According to other embodiments, a first type of second touch gesture may be used to adjust a first ultrasound parameter of the region 306 and a second, different, type of touch gesture may be used to adjust a second ultrasound parameter of the region 306.

At step 212, the processor 116 adjusts a value of an ultrasound parameter for the region 306 of the image 302 based on the second touch gesture. The ultrasound parameter may include a display parameter, such as contrast, brightness, or gain, or any other display parameter. The ultrasound parameter may also include a beamforming technique or a beamforming parameter. For example, according to embodiments where the beamforming is performed in software, the processor 116 may adjust beamforming technique applied to the ultrasound data associated with the region 306. In other words, the processor 116 may apply a first beamforming technique to the portion of the ultrasound data associated with the region 306 and a second beamforming technique that is different than the first beamforming technique. The ultrasound data may be raw data that has not yet been processed according to some embodiments using software beamforming. True Confocal Imaging (TCI), Adaptive Contrast Enhancement (ACE), and Retrospective Transmit Beamforming (RTB) are nonlimiting examples of different beamforming techniques that may be implemented when performing beamforming in software. According to an embodiment, adjusting the value of the ultrasound parameter for the region may include adjusting how much of a beamforming technique, such as ACE, is applied to the region 306. For example, the user may adjust the region so either more ACE or less ACE is applied to the region 306 compared to the rest of the image 302 outside the region 306. Other embodiments may use different beamforming techniques or may adjust the amount of various beamforming techniques that are applied to the region 306 according to various embodiments. According to an embodiment, a beamforming parameter may include a transmit delay time or a receive delay time.

Figure 6:
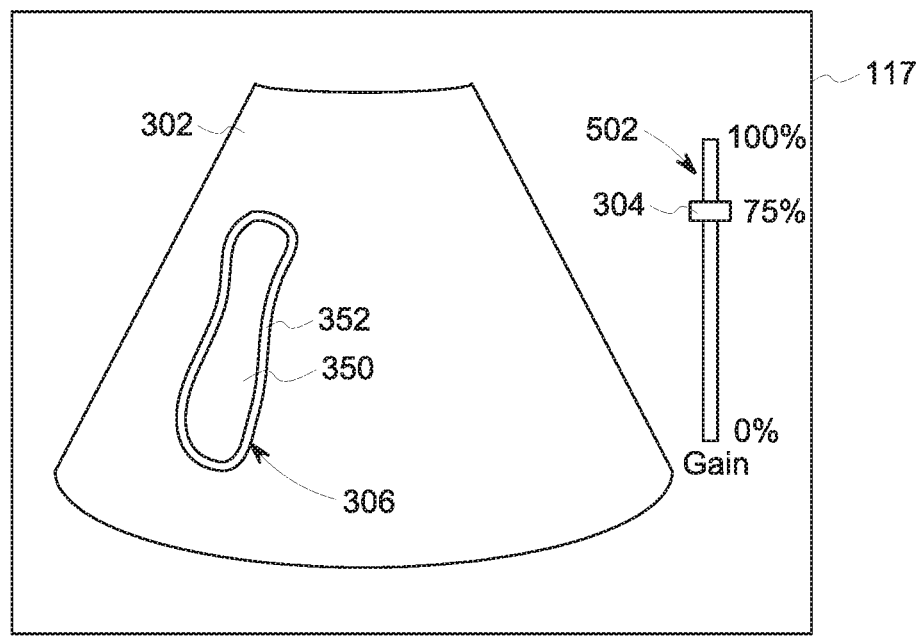
FIG. 6 is a schematic representation of an image in accordance with an embodiment.

According to an exemplary embodiment, the ultrasound parameter may comprise gain, and the processor 116 may increase the gain for the region 306 in response to a translational gesture in the first direction 506. According to an embodiment, the processor 116 may control the gain of the region 306 with the second touch gesture. For example, the gain of the region 306 may be increased as the user moves the first touch gesture in the first direction 506 and the gain of the region may be decreased as the user moves the first touch gesture in the second direction 508 that is opposite to the first direction 506. The second touch gesture may be used in a manner similar to a slider: the vertical position of the point of contact between the user and the touch screen 117 may determine the value of the ultrasound parameter, for the region 306. According to an embodiment, the processor 116 may display a virtual slider 502, shown in FIG. 6, after receiving the first touch gesture. FIG. 6 also shows the region 306, which may be graphically highlighted according to an embodiment. The virtual slider 502 is shown next to the ultrasound image in FIG. 6 on the touch screen 117, but in other embodiments the virtual slider 502 may be displayed on top of the image 302. The user may use the second touch gesture to control the position of an indicator 504 on the virtual slider 502 to control the value of the ultrasound parameter, such as gain, of the region 306. The processor 116 may optionally display more than one virtual slider on the display device 118 at the same time. For example, the processor 116 may display a first virtual slider in a first orientation to control a first ultrasound parameter and a second virtual slider in a second orientation to control a second ultrasound parameter. Or for embodiments where virtual sliders are not displayed, the processor 116 may respond to gestures in either of two directions by adjusting the first ultrasound parameter based on an overall vertical position of the touch input and adjusting the second ultrasound parameter based on the overall horizontal position of the touch input. For example, gestures in the first direction 506 may adjust gain and gestures in the third direction 510, orthogonal to the first direction 506, may adjust brightness. Or, a single gesture may be used to adjust both a first ultrasound parameter value and a second ultrasound parameter value. For example, the touch gesture could trace a non-linear shape on the touch screen 117, where displacement in the first direction 506 adjusts the first ultrasound parameter and, at the same time, displacement in a different direction, such as the third direction 510, orthogonal to the first direction, adjusts a second ultrasound parameter value.

The second touch gesture may be performed while the first touch gesture is being performed. FIG. 5 shows an embodiment where the second touch gesture is performed while the first touch gesture is being performed. According to other embodiments, the first touch gesture and the second touch gestures may be performed sequentially. For example, the first touch gesture may be used to identify the region and then, once the region has been identified, the user may input the second touch gesture.

Different touch gestures may be used to control the values of different ultrasound parameters within the region 306 according to various embodiments. For example, one or more translational gestures may be used to adjust the value of a first ultrasound parameter, and a second type of touch gesture, such as a pinch gesture or an expand gesture, may be used to control the value of the second ultrasound parameter. For example, a translational gesture in either the first direction 506 or the second direction 508 may be used to adjust the value of the gain within the region 306, and a pinch gesture or an expanding gesture may be used to adjust the value of a second ultrasound parameter, such as brightness, within the region 306.

According to various embodiments, the processor 116 may apply either a sharp border or a feathered border to the region 306 when adjusting the value of the ultrasound parameter at step 212. For embodiments with a sharp border, the processor 116 adjusts the value of the ultrasound parameter the same amount for the entire region 306. For embodiments with a feathered border, the processor 116 may apply a feathering function within a predetermined distance of an edge of the region 306. For example, the processor 116 may adjust the value of the ultrasound parameter differently in a portion of the region 306 within a predetermined distance from an edge of the region 306. FIG. 6 includes a representation of the region 306. The region 306 shown on FIG. 6 includes an inner region 350 and an outer region 352 within a predetermined distance from an edge of the region 306. The processor 116 may use a smoothing function within the outer region 352 to blend the change applied to the inner region 350 with rest of the image 302. The smoothing function may, for instance, be a linear function or any other type of function to reduce the appearance of the edge of the region 306 with respect to the portion of the image 302 not within the region 306.

If it is desired to make an additional ultrasound parameter adjustment at step 214, the method 200 advances to step 206, and steps 206, 208, 210, and 212 may be repeated. According to an embodiment, a second region may be identified and a value of an ultrasound parameter for the second region may be adjusted.

If it is not desired to make an additional ultrasound parameter adjustment at step 214, the method 200 advances to step 216.

The image acquired at step 202 may be a static image, or the image may be part of a cine loop, or it may be part of a volume acquisition. If the image is part of a cine loop, the method 200 advances to step 218 from step 216. If the image is not part of a cine loop, the method 200 advances to step 226. If the image is part of a volume acquisition, the method 200 advances to step 228 from step 226. If the image is not part of a volume acquisition, the method 200 advances to the end 236.

Figure 7:
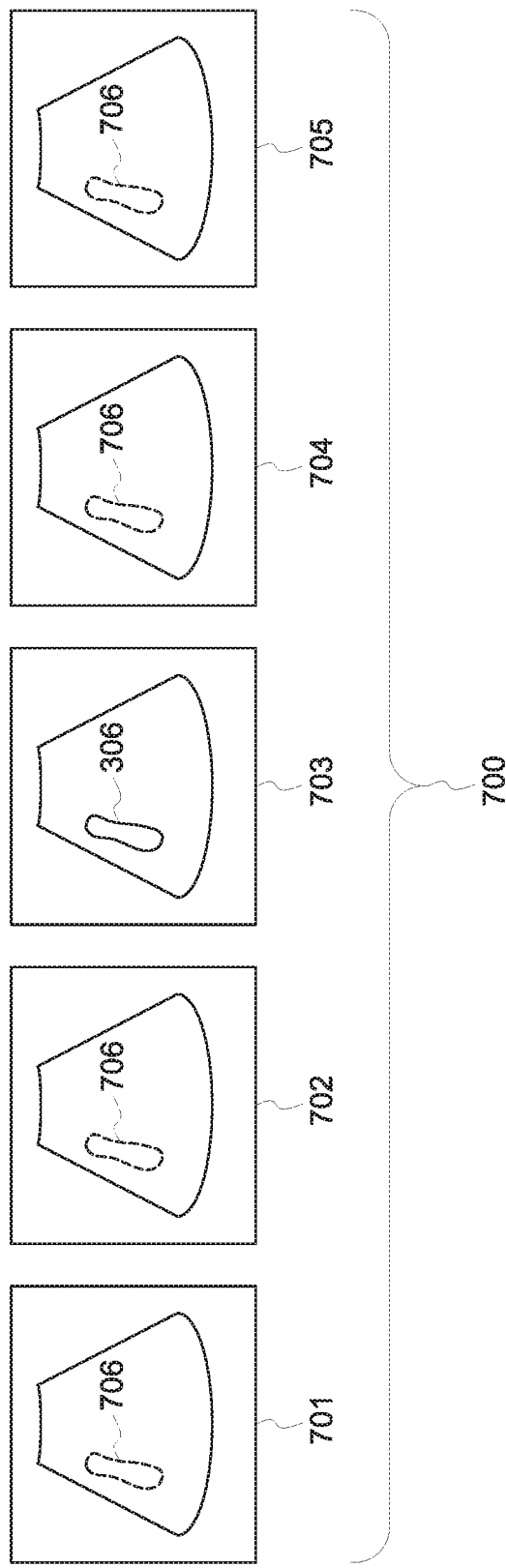
FIG. 7 is a schematic representation of a cine loop in accordance with an embodiment.

FIG. 7 is a schematic representation of an embodiment where the image 302 is part of a cine loop 702. FIG. 7 shows a plurality of images that would be displayed in sequence as part of a cine loop. For example, in FIG. 7, 701 is a first image, 702 is a second image, 703 is a third image, 704 is a fourth image, and 705 is a fifth image. According to an exemplary embodiment, the image 302 acquired at step 202 may be the third image 703. The region 306 is shown on the third image 703. The method 200 may advance from step 218 to step 220 if it is desired to adjust the value of the ultrasound parameter in corresponding frames. If, on the other hand, it is not desired to adjust the value of the ultrasound parameter in corresponding frames, then the method 200 advances to step 226.

As discussed above, if it is desired to adjust the value of an ultrasound parameter in a corresponding image, the method 200 advances to step 220. At step 220, the processor identifies a corresponding region 706 in one or more other images in the cine loop. The processor 116 may identify the corresponding region 706 in either some or all of the images in the cine loop 702. According to the embodiment shown in FIG. 7, the processor identifies the corresponding region 706 in the first image 701, the second image 702, the fourth image 704, and the fifth image 705. However, according to other embodiments, the processor 116 may identify corresponding region 706 in only a subset of the images. For example, the second image 702 and the fourth image 704 are both adjacent to the third image 703. The processor 116 may only identify corresponding regions within a specified number of images of the image where the region was identified in the cine loop 702.

The corresponding region is shown in the first image 701, the second image 702, the fourth image 704, and the fifth image 705 according to the embodiment shown in FIG. 7. The corresponding region 706 is shown in dashed line in FIG. 7. The processor 116 may use a variety of techniques to identify the corresponding region 706 in one or more other images in the cine loop 702. For example, the processor 116 may identify the corresponding region 706 by using the same geometrical position within the image. For example, the corresponding region 706 shown in FIG. 2 may have the same position within the second image 702 as the region 306 has within the third image 703. According to other embodiments, the processor 116 may use other techniques, such as image processing, to identify the corresponding region 706. For example, the processor may use techniques such as edge detection, B-splines, shape-based detection algorithms, average intensity, segmentation, speckle tracking, or any other image-processing based techniques to identify a corresponding region, with a predetermined amount of similarity to the region 306 in the third image 703.

At step 222, the processor 116 adjusts the value of the ultrasound parameter in the one or more corresponding regions 706 for the other images within the cine loop 702. The processor 116 may make the same correction to the ultrasound parameter in each of the corresponding regions 706 as was made in the region 306. Or, according to an embodiment, the processor 116 may apply a smoothing function so that the amount that the ultrasound parameter is adjusted in each corresponding region 706 varies based on the distance to the image in which the correction was made. For example, the processor may apply a smaller adjustment to the value of the ultrasound parameter in the first image 701 and the fifth image 705, both of which are two images away from the third image 703 compared to the adjustment to the value of the ultrasound parameter made in the second image 702 and the fourth image 704, both of which are only one image away (i.e., they are adjacent to the third image 703) from third image 703 in the cine loop 700.

Figure 8:
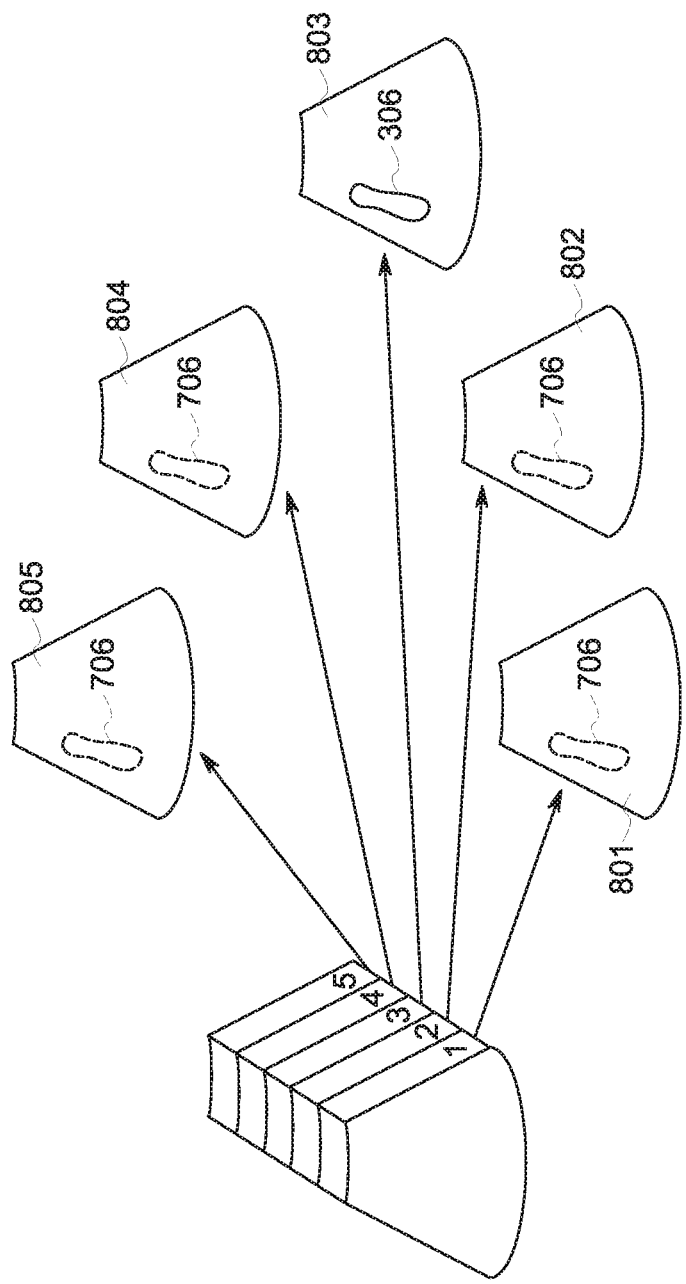
FIG. 8 is a schematic representation of a volume acquired with an ultrasound imaging system in accordance with an embodiment.

Referring now to step 228, FIG. 8 shows a schematic representation of an embodiment, where the image acquired at step 202 is part of a volume acquisition. The volume 802 may be acquired with many different techniques, including acquiring images of a plurality of different planes. The volume acquisition may be performed with an ultrasound probe with a position tracking system, a mechanical 3D probe or an E4D probe with a 2D matrix array. It may be possible to generate and display an image of a plane or a slab of the volume. For example, 5 different slabs are show in FIG. 8 and they are numbered 1, 2, 3, 4 and 5. The image 803 represents slab 3 and the image 804 represents slab 4. The region 306 may be identified at step 230 in image 803 according to an embodiment.

The processor 116 may use a variety of techniques to identify the corresponding region 706 in one or more other images representing different planes in the volume 802. For example, the processor 116 may identify the corresponding region 706 by using the same geometrical position within the image. For example, the corresponding region 706 shown in FIG. 2 may have the same position within the second image 802 as the region 306 has within the third image 803. According to other embodiments, the processor 116 may use other techniques, such as image processing, to identify the corresponding region 706. For example, the processor 116 may use techniques such as edge detection, B-splines, shape-based detection algorithms, average intensity, segmentation, speckle tracking, or any other image-processing based techniques to identify a corresponding region, with a predetermined amount of similarity to the region 306 in the third image 803.

At step 232, the processor 116 adjusts the ultrasound parameter in one or more corresponding regions 706 for images of other planes within the volume 802. The processor 116 may make the same correction to the ultrasound parameter in the corresponding regions 706 as was made in the region 306. Or, according to an embodiment, the processor 116 may apply a smoothing function so that the amount that the ultrasound parameter is adjusted in the corresponding regions 706 varies based on the spatial distance of the plane from the plane of the image in which the ultrasound parameter was adjusted. For example, the processor may apply a smaller adjustment to the value of the ultrasound parameter in the first image 801 and the fifth image 805, both of which are two images away from the third image 803, compared to the adjustment to the value of the ultrasound parameter made in the second image 802 and the fourth image 804, both of which represent planes that are spatially closer to the third plane than the first image 801 or the fifth image 805.

It should be appreciated by those skilled in the art that the method 200 may be performed on one or more images that are part of a live acquisition. According to an embodiment where the ultrasound parameter is adjusted in an image that is part of a live acquisition, the value of the ultrasound parameter may be adjusted in a single frame or image, such as during a freeze operation, for example, and then the same change in the value of the ultrasound parameter may optionally be applied to all frames acquired after the image during the live acquisition. Or according to other embodiments, the method 200 may be performed on one or more images that were acquired at an earlier time and subsequently accessed by the processor from a memory, such as the memory 120 shown in FIG. 1.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method of ultrasound imaging, the method comprising:
    acquiring an image with an ultrasound probe;
    displaying the image on a touch screen;
    detecting a first touch gesture inputted via the touch screen;
    selecting a region of the image based on the first touch gesture, wherein, after said selecting the region, the image includes the region and a rest of the image outside the region;
    detecting a second touch gesture inputted via the touch screen;
    adjusting a value of an ultrasound parameter for the region of the image based on the second touch gesture, wherein the rest of the image outside the region is not adjusted based on the second touch gesture;
    wherein the image is at least one of part of a cine loop comprising a plurality of images or part of a volume acquisition;
    wherein, if the image is part of the cine loop, the method further comprises automatically adjusting, with a processor, the ultrasound parameter for a corresponding region in at least two of the plurality of images in the cine loop and not adjusting the ultrasound parameter outside of the corresponding region in the at least two of the plurality of images in the cine loop; and
    wherein, if the image is part of the volume acquisition, the method further comprises automatically adjusting, with the processor, the ultrasound parameter for a corresponding region in at least one other image representing a different plane or slab in the volume and not adjusting the ultrasound parameter outside of the corresponding region in the different plane or slab in the volume.

2. The method of claim 1, wherein the first touch gesture comprises tracing a border of the region on the touch screen.

3. The method of claim 2, further comprising graphically highlighting the border of the region on the touch screen.

4. The method of claim 1, wherein the first touch gesture comprises touching the region on the touch screen within a designated period of time.

5. The method of claim 1, wherein the first touch gesture comprises covering the region of the image on the touch screen.

6. The method of claim 5, wherein the second touch gesture is inputted while the region of the image is covered with first touch gesture.

7. The method of claim 6, wherein the second touch gesture is a translational gesture.

8. The method of claim 1, wherein the second touch gesture is a translational gesture.

9. The method of claim 1, wherein the second touch gesture is selected from the group consisting of a pinch gesture and an expand gesture.

10. The method of claim 1, wherein the ultrasound parameter is selected from the group consisting of gain, brightness, and contrast.

11. The method of claim 1, wherein the ultrasound parameter is one of a beamforming technique and a beamforming parameter.

12. The method of claim 1, further comprising displaying a virtual slider on the display device after selecting the region with the first touch gesture.

13. The method of claim 1, wherein adjusting the value of the ultrasound parameter within the region comprises applying a feathering function within a predetermined distance of an edge of the region.

14. The method of claim 1, wherein the image is part of the cine loop, and wherein said automatically adjusting the ultrasound parameter for the corresponding region in at least two of the plurality of images in the cine loop comprises automatically adjusting the ultrasound parameter for the corresponding region in each of the plurality of images in the cine loop.

15. The method of claim 14, wherein said automatically adjusting the ultrasound parameter in each of the plurality of images comprises making a same correction to the ultrasound parameter for the corresponding region in each of the plurality of images in the cine loop.

16. An ultrasound imaging system comprising:
    an ultrasound probe;
    a touch screen; and
    a processor in electronic communication with the ultrasound probe and the touch screen, wherein the processor is configured to:
    control the ultrasound probe to acquire an image;
    display the image on the touch screen;
    detect a first touch gesture inputted via the touch screen;
    select a region of the image based on the first touch gesture, wherein, after the region is selected based on the first touch gesture, the image includes the region and a rest of the image outside the region;
    receive a second touch gesture inputted via the touch screen; and
    adjust a value of an ultrasound parameter for the region of the image based on the second touch gesture, wherein the rest of the image outside the region is not adjusted based on the second touch gesture;

wherein the image is at least one of part of a cine loop comprising a plurality of images or part of a volume acquisition;

wherein, if the image is part of the cine loop, the processor is further configured to automatically adjust the ultrasound parameter for a corresponding region in at least two of the plurality of the images in the cine loop and not adjust the ultrasound parameter outside of the corresponding region in the at least two of the plurality of images in the cine loop; and wherein, if the image is part of the volume acquisition, the processor is further configured to automatically adjust the ultrasound parameter for a corresponding region in at least one other image representing a different plane or slab in the volume and not adjust the ultrasound parameter outside of the corresponding region in the different plane or slab in the volume.

17. The ultrasound imaging system of claim 16, wherein the first touch gesture comprises covering the region of the image on the touch screen.

18. The ultrasound imaging system of claim 17, wherein the second touch gesture is a translational gesture that is inputted at the same time while the first touch gesture is being inputted.

19. The ultrasound imaging system of claim 16, wherein the first touch gesture comprises tracing a border of the region on the touch screen.

20. The ultrasound imaging system of claim 19, wherein the processor is configured to graphically highlight the region on the touch screen after receiving the first touch gesture.

21. The ultrasound imaging system of claim 16, wherein the image is part of the cine loop and the processor is configured to automatically adjust the ultrasound parameter for the corresponding region in each the plurality of images in the cine loop.

22. The ultrasound imaging system of claim 21, wherein the processor is configured to make a same correction to the ultrasound parameter for the corresponding region in each of the plurality of images in the cine loop.

* * * * *